Figure 1:
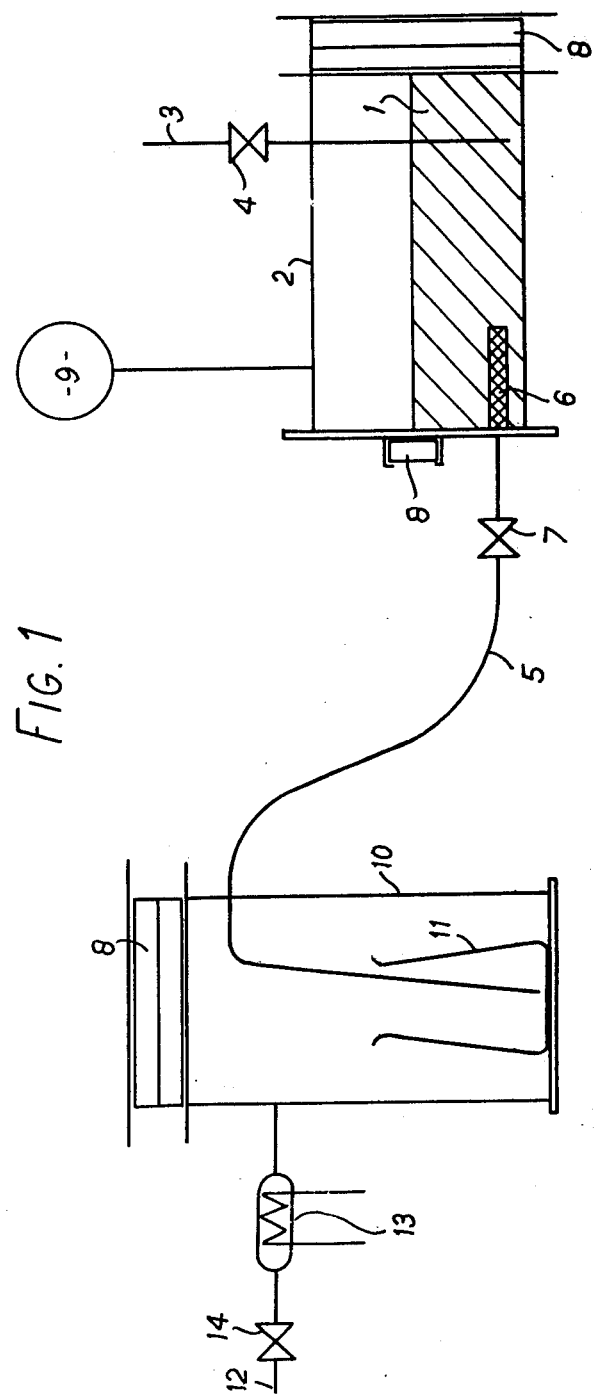

United States Patent [19]

Laws et al.

[11] 4,212,895

[45] Jul. 15, 1980

[54] PRODUCTION OF ISO-α-ACID

[75] Inventors: Derek R. J. Laws, Bexleyheath; Nigel A. Bath, Kemsing; Colin S. Ennis, Chislehurst; John A. Pickett, Kimpton; Alfred G. Wheldon, Galley Wood, all of England

[73] Assignee: Brewing Patents Limited, London, England

[21] Appl. No.: 793,357

[22] Filed: May 3, 1977

[30] Foreign Application Priority Data

Oct. 13, 1976 [GB] United Kingdom ............... 42613/76

[51] Int. Cl.$^2$ ............................ C12C 3/00; C12C 9/02
[52] U.S. Cl. ...................................... 426/600; 426/16; 426/429
[58] Field of Search .................... 426/429, 600, 16, 11

[56] References Cited

FOREIGN PATENT DOCUMENTS 296104  5/1966  Australia .
4844864 12/1970 Japan .
1388581  3/1975  United Kingdom .

*Primary Examiner*—David M. Naff
*Attorney, Agent, or Firm*—Wenderoth, Lind & Ponack

[57] ABSTRACT

A method of providing a high quality iso-α-acid preparation is described. The method involves extracting a high quality primary extract containing α-acids from hops using liquid $CO_2$ and isomerizing the α-acids in the primary extract. The liquid $CO_2$ extraction is performed at a sub-critical temperature of not less than $-5°$ C. The primary extract contains α-acids, β-acids, hop oil and usually no significant amounts of other organic compounds originating from the hops. In the preferred method the primary extract is not purified and the isomerization is performed by boiling an alkaline solution of the extract. This boiling can be utilized to remove the hop oil. The β-acids can be readily removed by acidifying the solution of iso-α-acid and filtering off the precipitated β-acids. The iso-α-acid preparation is of outstanding purity and can be added to beer after fermentation and in particular to bright beer after final filtration to provide bitterness.

2 Claims, 3 Drawing Figures

PRODUCTION OF ISO-α-ACID

This invention relates to the manufacture of iso-α-acids, suitable for use in beer making from α-acids extracted from hops.

It is common practice to extract various constituents from hops and to use these extracted constituents in place of hops themselves in making beer. The principal constituents which have been so extracted previously are the resins and in particular the α-acid fraction of the soft resins which on chemical rearrangement give iso-α-acids which are the main bittering components of beer. The main advantage of extracting α-acids is that the α-acids can be used much more efficiently than is possible in traditional beer making. In traditional beer making typically only 25% to 35% of the α-acids in the original hops are utilized. By extracting the α-acids, isomerizing them separately from the beer and adding the iso-α-acids produced to beer after fermentation α-acid utilization can be much higher, typically from 60% to 85%. A further substantial advantage in using extracts is that they can be stored for longer periods without the, presumably oxidative, degradation especially of the bitter principles including the α-acids that occurs in hops under extended storage.

Conventional hop extraction procedure involve the use of organic solvents such as methylene chloride, trichloroethylene, hexane and/or methanol. These solvents will readily dissolve not only the desired α-acids but relatively large proportions of β-acids, tannins, chlorophyll and various other hop constituents.

A primary extract made by extracting hops with an organic solvent would typically have the following composition:

|  | wt % |  | wt % |
|---|---|---|---|
| α-acids | 8–45 | tannins | 0.5–5 |
| β-acids | 8–20 | chlorophyll | up to 1 |
| uncharacterized soft resins | 3–8 | fines (cellular debris) | 2–5 |
| hard resins | 2–10 | inorganic salts | 0.5–1 |
| hop oil | 1–5 |  |  |
| fats and waxes | 1–2 | residual solvent (usually $CH_2Cl_2$ or $CH_3OH$) | 1.5–2.2 |
| total resins | 15–60 | water | 1–15 |

To obtain high quality α-acids suitable for isomerization the crude extract has to be extensively purified often involving other organic solvents and invariably involving many and often complex steps. Further, it is difficult to entirely remove the organic solvent from the extract, typical commercial extracts can contain over 1% by weight solvent. Whilst it is believed that residual solvents particularly of methylene chloride and methanol are lost entirely during beer making, it is not a wholly satisfactory position to rely on such 'accidental' elimination of possibly noxious materials during production of a foodstuff. Further, although there is at present no great technical difficulty in meeting the public health requirements for levels of residual solvents there may well be considerable difficulties in the future.

An organic solvent extract, purified to be suitable for isomerization to give an iso-α-acid preparation suitable for use in bittering beer, would typically have the following composition:

|  | wt % |  | wt % |
|---|---|---|---|
| α-acids | 60–80 | tannins | ca. 0.1 |
| β-acids | 0.3–0.5 | chlorophyll | ca. 0.1 |
| uncharacterized soft resins | 1–2 | fines | nil |
| hard resins | 1–5 | inorganic salts | substantially nil |
| hop oil | up to 1 | residual solvent* | 0.5 to 1 |
| fats and waxes | ca. 0.1 | water | up to 10 |
| total resins | 70–90 |  |  |

*In addition to $CH_2Cl_2$ and $CH_3OH$ which are commonly used both in extraction and purification, these solvent residues may include solvents such as ethyl acetate, butanol and trichloroethylene.

Fluid carbon dioxide either in the form of the liquid or the supercritical gas has been suggested as an extraction medium for hops. Thus, British Pat. No. 1,388,581 describes a method of making a hop extract by extracting hops with a variety of gases in the supercritical state with respect to temperature and pressure. Carbon dioxide is stated to be the most preferred gas. Extraction under such supercritical conditions with $CO_2$ typically yields an olive-green pasty product which contains α-acids, β-acids, uncharacterized soft resins, hard resins and small quantities of tannins. The extraction conditions can be varied to give yields of α-acids proportionately higher than the concentrations in the starting hops, the best extracts described, however, containing only about one-third α-acids. The optimum extraction conditions are stated to involve extraction under a pressure substantially in excess of the critical pressure, which for $CO_2$ is about 72.8 atmospheres, preferably in excess of 100 atmospheres (gauge) and temperatures of from 40° to 50° C. It is stated that by appropriate selection of the extraction conditions, it is possible to extract substantially all the soft resins and the essential oil of hops whilst minimizing the extraction of hard resins or that the proportionate extraction of β-acids can be reduced but at the expense of increasing the proportion of hard resins extracted. Further, it is stated to be possible to extract hops with liquid $CO_2$ but this does not form part of the invention of this prior patent because 'its dissolving power is less than that of supercritical $CO_2$'.

The extract as described in British Pat. No. 3,388,581 compares favourably with typical primary extracts obtained using organic solvents and would appear to be suitable for use in brewing beer e.g. by addition to the copper. However, the extract described would not be suitable for isomerization without condiserable purification to remove components which would produce adverse flavours under typical isomerization conditions and also result in the formation of substantial quantities of haze when added to beer. (It is not practical to effect purification after isomerization because the mixture is even more complex than the impure extract). In the present state of extract technology, this would require the use of organic solvents, thus giving up one of the main advantages of using supercritical $CO_2$ in extracting hops.

Liquid $CO_2$ is described as an extraction medium for hops in USSR Author's Certificate No. 167798 in the name of Pekhov, Ponamarenko and Prokopchuk and by Pekhov in Masloboino-Zhirovanaya Promyshlemnost vol 34, part 10 (1968) pages 26 to 29. The product obtained by extraction of hops with liquid $CO_2$ at 20° to 25° C. is stated in the Author's Certificate to be a light brown viscous mass. Shafton and Naboka in ISU Sev-Kauk Nauchn Tsentra Ugssh Shk, Ser Tekh Nauk 1975, 3(3), 29–31 [Chem Abs Vol 84 (1976) 120046a] describe $CO_2$ extracts of hops as complex mixtures of $\alpha$-, $\beta$- and $\gamma$-acids, $\alpha$-, $\beta$- and $\gamma$-soft resins and hard resins which are subject to substantial deterioration, especially by fairly rapid autoxidation on storage. The purity and stability of such $CO_2$ extracts is not altogether certain but, although it may be possible to use them in beer making by addition to the copper it is clear that they could not be isomerized to give an iso-$\alpha$-acid preparation without substantial purification and, in any event, are considerably less stable under storage than conventional hop extracts made using organic solvents. Heretofore it has not been recognized that a primary extract of hops could be obtained which would be satisfactory for direct isomerization to give an iso-$\alpha$-acid preparation suitable for bittering beer. The present invention is based on the discovery that extracting hops with liquid $CO_2$ (i.e. under sub-critical conditions) can be satisfactorily isomerized without needing prior purification.

It is an object of the present invention to provide an improved process for the manufacture of iso-$\alpha$-acid preparations suitable for addition to beer and in particular to high quality preparations suitable for addition to bright beer after filtration.

The present invention accordingly provides a method of making an iso-$\alpha$-acid preparation which method comprises contacting hops with liquid carbon dioxide at a temperature of not less than $-5°$ C. thereby extracting at least a portion of the $\alpha$-acids contained in the hops into the liquid carbon dioxide, isolating a primary hop extract of high purity from the liquid carbon dioxide and isomerizing the $\alpha$-acids present in the hop extract to iso-$\alpha$-acids.

In the practise of the present invention the high purity primary hop extract isolated as an intermediate product generally contains $\alpha$-acids, $\beta$-acids hop oil, usually small quantities of water and usually no more than trace quantities of the main impurities seen in primary organic solvent extracts viz: uncharacterized soft resins, hard resins, tannins and chlorophyll.

Table 1 sets out the purity of the primary extract as measured by the quantities of the impurities which interfere with the subsequent isomerization. Column A gives the maximum permissible proportion of the impurities above which we have found that the impurities interfere substantially with subsequent isomerization, Column B gives the expected maximum proportion of the impurities extracted by liquid $CO_2$ under the general conditions set out herein and Column C gives figures typical of what we expect to obtain.

Table 1

| Impurity | [1]Amount of Impurity wt % on extract | | |
|---|---|---|---|
| | A | B | C |
| uncharacterized soft resins | 3 | 0.1 | <0.1[2] |
| hard resins | 0.5 | 0.1 | none |
| Tannins | 0.5 | 0.1 | none |
| Chlorophyll | 0.2 | 0.1 | none |
| fats and waxes | 0.2 | 0.1 | <0.1[2] |
| fines | 0.5 | none | none |
| inorganic salts | 0.5 | 0.1 | <0.1[2] |
| Total | 4% | 0.3 | 0.1 |

[1]See below for a summary of the Analytical techniques used.
[2]These figures indicate that with some primary extracts the impurities were qualitatively just detected with the Analytical techniques used but that the amounts were too small to be estimated with any degree of accuracy. The figures given as maximum values represent the limit of the analysis; the actual quantities of the impurities present may be even smaller.

The main components of the primary extract are as indicated above, $\alpha$-acids, $\beta$-acids and hop oil extract has the following composition in respect of these components.

| | wt %[1] |
|---|---|
| $\alpha$-acids | 40 to 75[3] |
| $\beta$-acids | 20 to 40 |
| total resins | 70 to 98 |
| hop oil | up to 10[3] |
| water | up to 5 |

[1]These figures are based on analyses for the resins performed by the method described in Analytica EBC, published by Schweizer Brauerei Rundschau, 3rd Edition, 1975, page E49 and analyses for the non-resin components especially the tannins and chlorophyll by the method described by J Jerumanis in Bulletin Association Anciens Etundiants Brasserie Louvain, 1969, volume 65, page 113.
[3]The maximum analytical figures for $\alpha$-acids and hop oil will only generally be attained with hops containing unusually high proportions of these materials. More usually the upper limits will be about 65% for $\alpha$-acids and about 3% for hop oil.

By referring to the primary extract as being of high purity we mean that the undesired impurities as set out in Table 1 are not present in sufficient quantities to necessitate purification of the primary extract prior to isomerization. This generally means that the quantities of the impurities are less than those given in column A of Table 1 although we expect that practical extractions will be much better than these maximum figures.

For practical purposes the composition of extract can be summarised as

| | wt % | | |
|---|---|---|---|
| $\alpha$-acids | 40 to 75 | more usually | 40 to 65 |
| $\beta$-acids | 20 to 40 | more usually | 25 to 35 |
| total resins | 70 to 95 | more usually | 80 to 95 |
| hop oil | up to 10 | more usually | up to 3 |
| water | typically | 2 to 5 | | and substantially no organic impurities originating from the hops.

The amount of water present in the extract is not, in itself, critical, but, as is discussed below, if substantial amounts of water are present in the carbon dioxide at the point of extraction then tannins may be extracted from the hops. It seems that, using suitably dry liquid $CO_2$, the amount of water in the extract depends on the amount present in the hops and thus, whilst the figures given above are typical, amounts outside the range indicated may be obtained in some circumstances.

The high quality primary extract has the golden yellow colour of $\alpha$-acids and, at ambient temperature is usually a solid or semi-solid crystalline material, the exact form depending on the particular conditions of extraction and the type of hop extracted. A further indication of the purity is that typical primary extracts separate indentifiable crystals of $\alpha$- and $\beta$-acids on cooling to ca 4° C. Conventional primary solvent extracts show no signs of such crystalization.

It will be noted that this primary extract is a very much cleaner material than typical organic solvent primary extracts and especially with regard to the hard resin and uncharacterized soft resin components, is substantially purer than conventional organic solvents extracts even after purification. A principal difference is that the extract obtained using liquid carbon dioxide contains substantially more $\beta$-acids than typical conventional purified extracts. It seems that the $\beta$-acids can be tolerated at these much higher levels because of the otherwise outstanding cleaness and purity of the extract. Thus, the high level of $\beta$-acids does not prevent the satisfactory isomerization of the α-acids in the production of an iso-α-acid preparation and the β-acids can be removed from such an iso-α-acid preparation by filtration at a suitable pH.

As far as we are aware, this has not previously been reported, indeed the tenor of prior art discussions on the amounts of β-acids tolerable in extracts to be isomerized indicate, on the contrary, that the maximum tolerable amounts of β-acids were very small typically less than 1%. In the present invention we believe that it is possible to isomerize the α-acids because the levels of other materials which might interfere with isomerization are so low.

The general physical conditions of temperature and pressure used in the extraction steps are to some extent critical to the invention. If the extraction is performed at temperatures below $-5°$ C. undesired organic compounds tend to be extracted. These compounds seem to be mainly fats and waxes but at lower temperatures increasing quantities of hard resin and probably tannins are extracted. At sub-critical temperatures above $-5°$ C., we have been able to obtain high purity extracts. The extraction temperature is sub-critical because, as is clear from British Pat. No. 1,388,581, the use of super-critical temperatures results in the extraction of substantial quantities of hard resins, chlorophyll, tannins etc.

Within this temperature range good results can be obtained but generally we prefer not to use temperatures close to the critical temperature in order to avoid the possibility of the $CO_2$ becoming supercritical accidentally. The generally preferred temperature range is from $-5°$ to $20°$ C.

The pressure at which the extraction is performed must clearly, be sufficient to keep the $CO_2$ liquid and not so high that the $CO_2$ behaves like the supercritical fluid as described in British Pat. No. 1,388,581. Generally it is both convenient and preferred to operate under the vapour pressure of liquid $CO_2$ at the extraction temperature. In order to allow for minor temperature differences between different parts of the extraction apparatus, particularly when sub-ambient temperatures are used for extraction, and also to allow for hydrostatic pressure differences within the apparatus, the pressure will normally be slightly e.g. up to 10% in excess of the vapour pressure. The variation of the vapour pressure of liquid $CO_2$ with temperature is shown in Table 2.

Table 2

| Temperature °C. | Vapour Pressure Atmospheres (absolute) |
| --- | --- |
| 31° (crit. temp) | 72.8 |
| 30 | 71.2 |
| 20 | 56.5 |
| 10 | 44.4 |
| 0 | 34.4 |
| −5 | 30.1 |

From an engineering standpoint it is desirable to have the pressure as low as possible and to have the temperature as near ambient as possible. These requirements are not strictly compatible and in practice a compromist taking these considerations into account as well as the rate of extraction, selectively and purity of the extract will usually determine the optimum operating temperature in any particular case.

The form in which the hops are extracted is not especially critical in that efficient extractions can be achieved from green or dried hops, hop cones, milled, powdered, pelleted powdered hops or curshed hop pellets.

However the bulk density of hop cones is very low and as a practical matter it is preferred to use powdered or pelletted hops in the extraction. Powdered hops seem to be satisfactory for extraction in the invention and the further processing required to pellet hops seems to provide no particular advantage in extraction. The optimum extraction conditions may vary depending on the particular form used but determination of precise optima seems to be a matter of straightforward chemical engineering.

Of course, the hops should themselves be of suitably high quality. Inferior or deteriorated hops may not produce satisfactory extracts. The particular type (cultivar) of hop used does not seem to be critical to the extraction itself and both seeded and seedless hops can be satisfactorily extracted. The particular composition of the extract and yield obtained is a function of the hop cultivars: Wye Northdown, Wye Saxon, Northern Brewer, Wye Challenger, Bullion, Comet, Pride of Ringwood and Styrian Golding.

The amount of liquid $CO_2$ needed to extract the hops appears to be a function of the solubility of α-acids in the $CO_2$, the type of extraction system and of the precise conditions employed. We have not yet determined the limits of solubility of α-acids in fluid $CO_2$ but have experienced no difficulties in achieving concentrations of 3.7 grams per liter and higher concentrations could well be possible. Extraction efficiency both in terms of the proportion of α-acids extracted and the amount of $CO_2$ necessary to extract them is increased by increasing the effective contact time between the $CO_2$ and the hops. This can be done for example by simple recycling of the $CO_2$ through an extraction bed. Alternatively, this can be done by using a semi-continuous or continuous extraction procedure e.g. employing counter-current techniques. Although it is desirable to increase the effective contact time between the liquid $CO_2$ and the hops we have found that substantially complete extraction can be obtained in the laboratory in times comparable to the contact times used in conventional commercial solvent extractions. We believe that, in fact, liquid $CO_2$ will extract hops substantially more rapidly than conventional organic solvents and that this does not specifically appear in the relatively small scale experiments we have performed to date because of the relative and absolute flow rate limitations imposed by the small scale of the apparatus used for extraction.

The degree of extraction of α-acids is a function of the precise method adopted. We have successfully extracted more than 90% of available α-acids without difficulty and believe that even higher rates of extraction are possible without great difficulty.

The extracted α-acids can readily be recovered from the liquid $CO_2$ extract by 'boiling off' the $CO_2$ as gas. This can conveniently be done by heating the solution under constant pressure so that the liquid $CO_2$ boils. This approximates to isothermal conditions. Alternatively, the evaporation of the gaseous $CO_2$ can be performed by reducing or releasing the pressure, i.e., approximately adiabatically. Both of these methods are satisfactory on a small scale the quality of the product not being affected. It is preferable, particularly in commercial operation, to recover the $CO_2$ and re-condense and re-use it as the extracting liquid. It is easier and thermodynamically more efficient and thus more economic to perform this recycling under approximately constant pressure thus taking advantage of the low specific heat and latent heat of vaporization of $CO_2$ to accomplish the necessary changes of state. The large pressure and temperature changes on adiabatic evaporation make it rather less preferred in this respect.

When the extract is isolated by warming the liquid $CO_2$ to evaporate it, it desirable to use a heat source at a moderately high temperature e.g. 30° to 40° C. in order to ensure adequate heat transfer. Further, because the extract lends to become fairly viscous and may even start to crystallise out at low temperatures e.g. below about 5° C., it is thus desirable to isolate the extract at near or slightly above ambient temperature to avoid these potential problems.

The primary hop extract thus obtained is a virtually pure mixture of $\alpha$-acids and $\beta$-acids together with part of the essential oil ('hop oil') present in the hops, but not usually any hard resins, chlorophyll or tannins. We have had no difficulty in isolating crude extracts which are substantially free from hard resins, chlorophyll, tannins, etc. This purity of the product is a marked advance over the products obtained by previously reported hop extraction techniques. A quantitative examination of the crude product indicates that there is a rather higher proportion of $\alpha$-acids as compared with $\beta$-acids in the product than would be expected solely on the basis of the relative proportions of $\alpha$- and $\beta$-acids in the hops. The degree of this selectivity is significantly higher than that reported in British Pat. No. 1,388,581 and we cannot explain why the conditions we use for extraction are particularly advantageous in this way as well as in other aspects of purity.

As has been set out above the primary extract produced in the method of present invention is usually a mixture of $\alpha$-acids, $\beta$-acids and at least a substantial part of the essential oil of hops. The mixture will usually contain moisture but this is not regarded as an impurity for further processing although it may be convenient and/or desirable to dry the extract if it is to be stored over long periods. The high purity extract is yellow in colour, e.e., the colour of the $\alpha$-acids, and not green, brown or otherwise dark in colour as is usual with conventional primary hop extracts including those described in British Pat. No. 1,388,581. Typically the extract is solid or a viscous paste or liquid the precise form depending largely on the temperature.

The extract includes some hop oil and since this can be a valuable product in its own right it can be removed from the primary extract by steam distillation under vacuum, e.g., under the general conditions of temperature and pressure set out in the specification of U.S. Pat. No. 3,979,527 to Laws and Pickett. Thus, conveniently the separation can be effected by mixing the extract with water and distilling the mixture under vacuum at a temperature of less than 50° C. typically from 20° to 25° C. The distillate, an emulsion of hop oil in water, can be collected as a dispersion in ice by cooling the vapour to $-20°$ C. or below. Hop oil distilled from the extract in this way can be used to impart hop aroma and flavour to beer. However, we have found that using liquid $CO_2$ substantially all of the hop oil is removed from the hops so, as described in the above specification, care must be taken to select only the desired fraction on steam distillation as described. Further, it seems that some of the more volatime components of the hop oil are extracted very rapidly by the liquid $CO_2$ and unless care is taken these components may be lost, even during the time when residual air is being flushed out of the extraction apparatus. For these reasons it seems preferable, if hop oil is desired as a separate product, to extract the hop oil from the hops prior to the extraction with liquid $CO_2$. In any event, it is probable that the liquid $CO_2$ extract will contain at least some hop oil components. Since, during isomerization some components of the hop oil may be degraded and contribute to off flavours and aromas, it will usually be desirable to remove the hop oil from the extract.

As discussed in U.S. Pat. No. 3,979,527, the quantities of hop oil which will normally be desired in beer to give hop aroma and flavour such as is obtained by dry hopping, are in the range of 0.5 to 2 ppm. The smount of hop oil in the primary $CO_2$ extract is usually such that, if all the hop oil were retained, the amount of the oil added to beer by using the final product iso-$\alpha$-acid preparation would be considerably in excess of what is desirable to give the beer hop aroma and flavour. This will be particularly true when the type of hop extracted is one having a high proportion of available hop oil. It is thus desirable to remove at leqst sufficient hop oil to prevent this becoming a serious problem.

One further practical point favouring separation of the hop oil before use of the iso-$\alpha$-acid preparation is that a brewer will generally prefer to use essentially pure materials. Thus, where he wishes to use the iso-$\alpha$-acid preparation produced by the invention and also hop oil isolated from the primary extract, he will prefer to have these materials supplied separately for use rather than to be supplied with a pre-prepared as unseparated mixture.

When the preferred isomerization technique, described in more detail below, is used it is not necessary to, and indeed it is preferred not to, specifically remove the hop oil from the extract before isomerisation. However, if it is desired to so purify the extract then this can be done by steam distilling all the hop oil off. However, care should be taken to avoid excessive heating as this can damage or destroy the bittering potential of the extract. Such damage can be avoided by performing the steam distillation at suitably reduced pressure e.g. such that the temperature is not more than 50° C.

In connection with the purity of the extract which we have noted is that the extract will readily form complexes with a number of metals such as iron and copper. Thus, passing extract containing liquid $CO_2$ through mild steel or copper tubing particularly in the presence of moisture results in iron or copper respectively being leached from the walls of the tubing. This is undesirable because it can give rise to corrosion problems in the extraction apparatus, salt crystallization in the extraction apparatus, especially with copper which form blue crystalline salts with the soft resin acids and contaminates the product with heavy metals. Although iron is not toxic, as is copper, it is undesired because other heavy metals which may be toxic may be carried with the iron and the presence of iron in the extract seems to reduce the stability of the product particularly with regard to oxidative degradation. Extracts contaminated with iron are typically brown rather than yellow in colour. The problem of contamination by metals can be overcome by using a suitably inert material for, or to line the extraction equipment. We have found that making the extraction equipment principally of stainless steel, glass (for viewing parts) and suitably inert plastics materials overcomes this problem. Other materials is within normal chemical engineering skill.

As is mentioned briefly above, the quality of the extract may be spoiled if excess water is present in the $CO_2$ used as extraction fluid, particularly insofar as tannins, being relatively soluble in water, may be extracted carried with the liquid $CO_2$. Commercial quality liquid $CO_2$ in the United Kingdom, such as is available from Distillers Comapny (Carbon Dioxide) Limited, is a high quality product whose water content is measured in parts per million (typically about 20 ppm). Such $CO_2$ is adequately dry for use in the present invention. The purity of such liquid $CO_2$ is well within the relevant British Standard (BS No. 4105/1967). We believe that liquid $CO_2$ complying with this British Standard is of sufficient purity for use in the present invention. The use of less pure liquid $CO_2$ may give rise to problems in the quality of the extract.

The possibility of heavy metal contamination and the presence of water and/or other impurities in the liquid $CO_2$ may, we believe, be at least in part responsible for the failure of the prior art proposals on extracting hops with liquid $CO_2$ to produce a product approaching the purity of that of the primary extract in the present invention.

The isomerization step in the method of the invention can be performed by any suitable method. However, some techniques such as photoisomerization methods may require that the extract be purified before isomerization and even though with the high purity extracts obtained in the present method such purification is relatively straightforward it constituees a further step which is not necessary when the preferred method of isomerization is employed.

Other techniques frequently include the use of organic solvents and are thus not preferred. Organic solvents are not necessary in the preferred method of isomerization.

The preferred method is to isomerise the $\alpha$-acids by heating and preferably boiling an aqueous solution of the extract which has been rendered alkaline. Typically the extract is dissolved in alkali, e.g. sodium and/or potassium hydroxide or preferably carbonate preferably to give a solution having a pH of from 8 to 11. For solutions not requiring subsequent dilution (see below) the concentration of $\alpha$-acids is typically from 0.5 to 5 $gl^{-1}$ and the concentration of sodium and/or potassium carbonate is from 0.01 to 0.5 N. The solution is then boiled, e.g., for from 5 minutes to 2 hours to isomerize the $\alpha$-acids to iso-$\alpha$-acids. During boiling hop oil is driven off with the steam. It is known that the alkali isomerisation of $\alpha$-acids can be carried out in relatively concentrated solution e.g. up to about 35% by weight $\alpha$-acids. Such high concentrations can be used in the isomerisation stage of the present invention if desired. The use of high concentrations can be advantageous in reducing the heating requirement during isomerisation and the subsequent cooling requirement and in that the total amount of alkali needed to maintain the desired pH of 8 to 11 is somewhat less than is necessary with more dilute solutions. This latter point may be relevant, as a reduction in the level of inorganic matter reduces the likelyhood of inorganic salts e.g. KCl or NaCl crystallizing out if the eventual iso-$\alpha$-acid preparation is concentrated substantially e.g. to between 30 and 40% by weight. Thus, the concentration of $\alpha$-acids during isomerisation is not limiting on the present invention, and concentrations up to e.g. 400 $gl^{-1}$ are contemplated. The particular concentration chosen is a matter for selection depending on the particular circumstances and we do not expect the skilled man to have any serious difficulty in this regard. Typically the concentration will be in the range of 0.5 to 300 $gl^{-1}$ more usually 3 to 100 $gl^{-1}$.

The solution is then cooled preferably at least to ambient temperature and optimally to between 0° and 10° C. The pH of the solution is then made acid, e.g., from 2.5 to 5 preferably 3.5 to 4.5 and optimally about 4.0. This can conveniently be done by adding a suitable quantity of acid such as hydrochloric acid. At this acid pH the $\beta$-acids are much less solutble than the iso-$\alpha$-acids and are precipitated and can be removed, e.g., by filtration or centrifugation. Where the isomerization has been carried out with a relatively concentrated solution of $\alpha$-acids then, because the solubility of iso-$\alpha$-acids at the acid pH's used to precipitate the $\alpha$-acids is fairly low, the isomerised alkaline extract solution may have to be diluted before acidification in order to avoid undesired loss of iso-$\alpha$-acids. Thus, at the optimum acidification pH of about 4,-iso-$\alpha$-acids are soluble to about 0.5% weight (ca 5 $gl^{-1}$), and alkaline isomerisation solutions move concentrated than this should be diluted before acidification to avoid precipitation and thus possible loss of iso-$\alpha$-acids. The preferred concentration of iso-$\alpha$-acids at this stage is pH dependent but is generally in the range 0.5 to 5 $gl^{-1}$ and optimally between 3 and 5 $gl^{-1}$.

Conveniently the solution is filtered with a filter aid such as kieselguhr. After filtration the iso-extract can be added directly to beer, as is described in detail below, to bitter it. However, the iso-extract is not very stable on storage at acid pH's and, especially if the extract is not to be added to beer immediately, it is thus preferable to make the pH moderately alkaline, e.g., to pH 8 to 10 preferably about 9.0 by adding a suitable alkali e.g. sodium and/or potassium hydroxide and/or carbonate and the solution concentrated to a desired extent (usually 10 to 40% iso- -acids).

We have found that if the isomerization is completed rapidly then a small proportion of the hop oil may not be boiled off with the steam. If complete removal of the hop oil is desired then this can be done by continuing boiling the alkaline mixture. However, when the iso-extract is concentrated before use as described below we have found that any remaining hop oil can conveniently be removed with the water evaporated from the iso extract.

Concentration can be carried out to obtain solid crystalline iso-$\alpha$-acids as the appropriate alkali metal salts if desired. Since iso-$\alpha$-acid can be lost by decomposition by overheating especially during concentration by evaporation it is preferred that in the evaporation the solution is not heated to more than 50° C. and more preferably not more than 40° C. We have experienced no difficulty in performing the evaporation at 35° C. Conveniently rapid evaporation can be performed under a partial vacuum. The concentration of the iso-extract need not, of course, be carried out to give solid iso-$\alpha$-acids. For storage and transportation concentration to form 10 to 40% w/v is generally satisfactory. Further, provided that there is no undue delay the step of making the iso-extract solution alkaline may be performed after, or even during concentration if desired.

The use of the preferred isomerization technique is especially advantageous because it enables the method of the invention to be carried out in a particularly elegant manner. Thus, in an especially highly preferred aspect the invention provides a method of making an isomerized hop extract which method comprises the steps of:

(i) extracting hops, preferably in crushed pellet form, with liquid $CO_2$ at a temperature of from $-5°$ C. to $30°$ C., preferably from $-5°$ C. to $20°$ C. and under a pressure slightly greater than that of the corresponding vapour pressure of liquid $CO_2$ at the extraction temperature;

(ii) recovering a primary hop extract of high purity by evaporating the liquid $CO_2$;

(iii) without further purification, preparing an alkaline aqueous solution containing the extract preferably in an amount corresponding to from 1 to 100 gl$^{-1}$ of $\alpha$-acids, containing sodium and/or potassium carbonate, preferably in a concentration of from 0.01 N to 0.5 N and preferably having a pH of from 8 to 11;

(iv) boiling this solution to convert substantially all the $\alpha$-acids present therein to iso-$\alpha$-acids and to remove hop components, preferably for a period of from 5 minutes to 2 hours;

(v) cooling the solution preferably to a temperature of from $0°$ to $10°$ C.;

(vi) if necessary diluting the alkaline solution to a concentration of not more than about 5 gl$^{-1}$ iso-$\alpha$-acids and adjusting the pH of the solution to from about 2 to about 5, preferably about 4.0, by adding acid;

(vii) filtering this acidified solution to remove $\beta$-acids precipitated therefrom whilst retaining the iso-$\alpha$-acids in solution; and optionally (viii) concentrating the solution of iso-$\alpha$-acids thus obtained to a predetermined extent by evaporation, preferably at a temperature of not more than $40°$ C., and (ix) either before, during or after concentration, adjusting the pH of the filtered solution to from 8 to 10 preferably about 9.0, by adding alkali.

The isomerized extract produced by the method of the invention is of excellent quality and can be obtained in high yield. We have been able to extract 85 to 95% of the $\alpha$-acid of hops without any substantial difficulty and we expect that higher level of extraction are possible. Typically up to about 70% of the $\beta$-acids are also extracted. Although the soft resin acids contents of different varieties of hops varies, we have not experienced difficulties in in extracting a number of different hop cultivars as set out above.

The conversion of the $\alpha$-acid content of the extract to iso-$\alpha$-acid can be performed substantially quantitatively be the preferred isomerization method used in the invention, losses in the filtration to remove the $\beta$-acids being slight. Losses during evaporation are not normally significant provided the temperature is kept below abour $40°$ C. Thus the effective yield of the method of this invention can be typically as high as 90% and higher yields are probably obtainable without very great difficulty.

It is an outstanding advantage of the iso-$\alpha$-acid preparation obtained by the method of the invention that it does not cause measurable haze on addition to beer. This compares highly favourably with isomerized extracts available commercially. The isomerized product of the in invention is of a sufficiently high quality that it can be added to bright beer after filtration without significant hazing. This has not heretofore been practically possible; even the best commercial isomerizates having to be added before final filtration at the latest because of their tendency to cause haze. The effective utilization of the bittering potential of the hops is thus reduced. With commercial isomerized extracts the utilization obtainable under normal conditions is between 70 and 75% and the maximum under carefully controlled and optimised conditions about 85%; with unisomerized extracts added to the copper utilization is typically 27 to 35% compated with about 25 to 3% when the hops are used without extraction. We have had no significant difficulty in obtaining utilization values of better than 80%, without specifically optimizing the conditions, and believe that values of 90% and more will be obtained by optimizing the methods of addition.

When commercial isomerized extracts are used to bitter beer there are sometimes problems with gushing. The main gushing promoters are oxidation products of hop resins which are present in the hops and/or formed during processing. Another advantage of our new process is that the resulting isomerized extracts show no tendency towards gushing. Hence gushing promoters are not extracted from the hops or formed during processing.

The quality of the iso-$\alpha$-acid preparations of this invention is evidenced by analysis. Examination by column chromatography, as described by Otter, Silvester and Taylor, J Inst Brew 78 (1972) 57, on typical samples produced as described above shows the presence of iso-$\alpha$-acids but fails to show any $\alpha$-acids, $\beta$-acids or humulinic acids. These components are generally just detectable by thin layer chromatography. Commercially available iso-extracts generally reveal much higher levels of these undesirable compounds. Further the iso-$\alpha$-acids of the present invention do not contain any detectable amounts of polyphenolic compounds. These are usually present in commercial extracts and are thought to contribute to the inferior properties of the prior art materials particularly with regard to haze formation.

Figure 2:
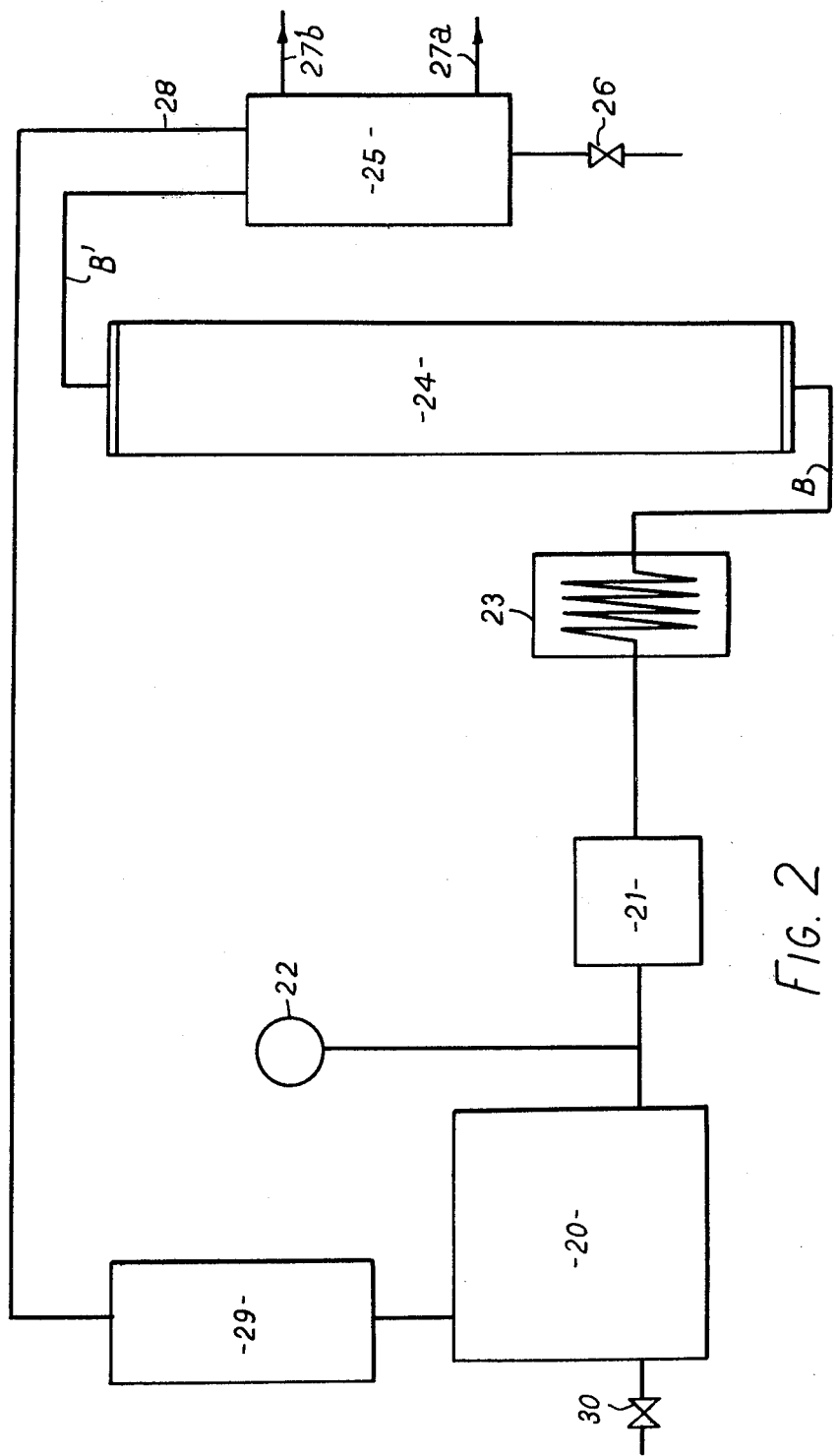

The invention will be described further in connection with the accompanying drawings, in which:

FIG. 1 illustrates apparatus for batch extraction of hops with liquid $CO_2$, and FIG. 2 schematically illustrates apparatus for semi-continuous extraction of hops with liquid $CO_2$.

Figure 3:
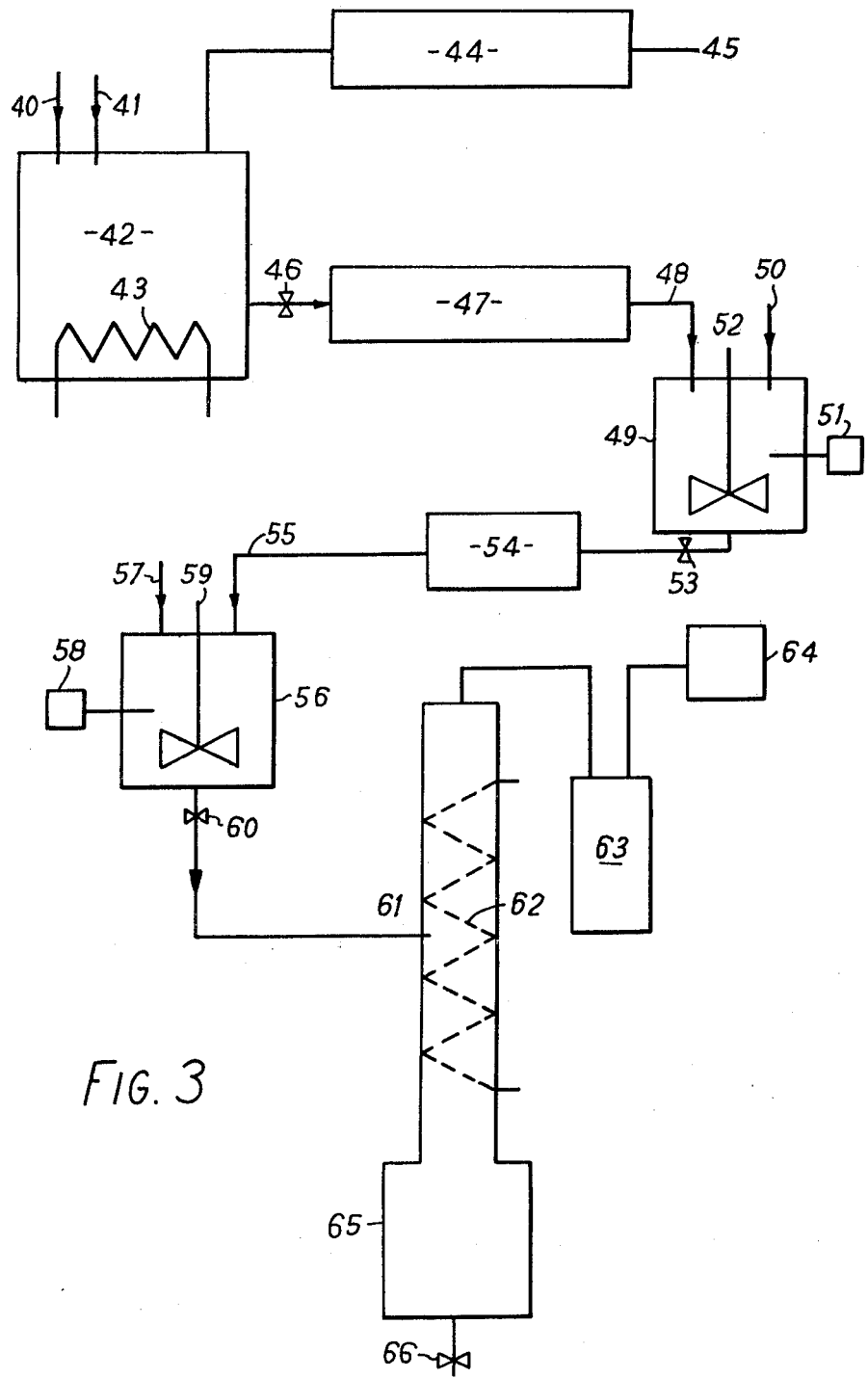

FIG. 3 schematically illustrates apparatus for converting a primary extract into an iso-$\alpha$-acid preparation suitable for addition to beer.

In FIG. 1, hops 1 are contained in a pressure cell 2 having inlet 3 with associated tap 4, outlet 5, including sintered metal filter 6, with associated tap 7, observation windows 8 and pressure gauge 9. To extract the hops, tap 7 is closed and liquid $CO_2$ is introduced into the cell 2 by way of inlet 3 and tap 4. Tap 4 is closed and the cell 2 rocked to mix the hops and liquid $CO_2$ to extract the soft resins ($\alpha$-acids and $\beta$-acids) into the liquid $CO_2$. When extraction is completed the extract can be transferred to a second pressure cell 10 containing flask 11 and including observation window 8 and exhaust line 12 provided with heater 13 and tap 14. To transfer, the extract tap 14 is closed and tap 7 is open and the extract flows through filter 6 (thus preventing any fines being carried with the extract) into flask 11 in cell 10. After completion of the transfer, tap 7 is closed. This extraction and transfer procedure can be repeated as necessary or desired to extract the hops. The extract can be separated from the liquid $CO_2$ by opening tap 14, thus controllably venting cell 10 to the atmosphere by way of heater 13.

In FIG. 2, liquid $CO_2$ in storage tank 20 is pumped by pump 21 at a pressure monitored by indicator 22 through heat exchanger 23 in which the temperature of the liquid $CO_2$ is adjusted to that desired for extraction. In a commercial extractor the storage tank 20 will normally be refrigerated to a temperature of between $-15°$ C. and $-20°$ C. For small scale extractions the storage tank can conveniently be replaced by a number liquid $CO_2$ cylinders arranged in parallel. When $CO_2$ cylinders are used, because of the small scale, these will not usually be deliberately cooled and, being at ambient temperature, they will have an internal pressure greater than the vapour pressure of liquid $CO_2$ at the extraction temperature and this excess pressure in the cylinders can be used to force the liquid $CO_2$ through the system at a suitable flow rate thus obviating the need for a pump.

As a practical matter it is convenient to adjust the temperature of the liquid $CO_2$ at the outlet of the heat exchanger 23 to allow for any temperature differences between ambient temperature and the actual temperature of extraction. We expect that the extraction in 11 generally be carried out at sub-ambient rather than super-ambient temperatures and the liquid $CO_2$ will thus be cooled to compensate for the absorption of heat from the environment, which being at ambient temperature, may be up to 20° C. warmer than the liquid $CO_2$ in the extraction column. To minimise such undesired heat transfer to the liquid $CO_2$, the extraction column and associated pipework valves etc. will normally be lagged to give a suitable degree of thermal insulation. With a suitably insulated column the liquid $CO_2$ will not usually need to be more than about 2° or 3° C. cooler than the desired extraction temperature. We have found that about 3° C. is generally a suitable margin in small scale extraction apparatus where heat pick up problems are more likely to arise than on commercial equipment because of the proportionalely larger surface area.

From the heat exchanger 23 the liquid $CO_2$ is passed through the extraction column 24 containing hops in suitable form e.g. as a powder or crushed pellets. In the apparatus illustrated the column is arranged vertically with the liquid $CO_2$ passing upwards through the column.

Although only one extraction column is illustrated in FIG. 2, others may be placed in paralel with it e.g. between B and B' and by switching the flow of $CO_2$ through such a plurality of columns (the necessary taps etc. are not shown) it is possible to run the apparatus semi-continuously e.g. when columns containing spent hops are isolated from the pressure circuit to refil them with fresh hops whilst continuing the extraction through the other column(s) thus enabling extract to be obtained continuously.

From the top of the extraction column the liquid $CO_2$ containing the extract is fed to an evaporator 25 where the $CO_2$ is boiled off through pipe 28. The evaporator is heated e.g. by warm water entering at 27a and leaving at 27b. This warm water can conveniently be at 40° C., although the temperature of the heating medium will depend to some extent on the extraction temperature and will be chosen to ensure adequate heat transfer and to avoid isolation of the extract at a temperature so low that it is very viscous of solid or so high that it may be degraded or decomposed. The extract, which will typically be a liquid at the contact temperature within the evaporator, is collected within the evaporator or a collecting vessel connected thereto and can be removed from time to time via tap 26.

The gaseous $CO_2$ coming from the evaporator 25 at outlet 28 is passed to condenser 29 in which the gaseous $CO_2$ is cooled to reliquefy it. The liquid $CO_2$ is passed to storage tank 20. From tank 20 the liquid $CO_2$ is pumped by pump 21 through heat exchanger 25 and thus recycled through column 24 to evaporator 25. Fresh liquid $CO_2$ can be introduced into the circuit via valve 30 to replace $CO_2$ lost when removing extract via valve 26 or when refilling extraction columns.

In FIG. 2 the liquid $CO_2$ is shown as passing upwardly through extraction column 24. Whilst we prefer for engineering reasons to pass the liquid $CO_2$ upwardly it is possible to pass it downwardly through a Other forms of equipment may be used to effect the extraction with liquid $CO_2$ and the extraction step of the invention is not limited by the particular form of apparatus in which the extraction is performed.

In FIG. 3 high quality primary liquid $CO_2$ hop extract 40 e.g. that produced using the apparatus of FIG. 1 or 2 as described, is fed together with an alkali e.g. sodium or potassium carbonate solution of a suitable concentration e.g. 0.01 N to 0.5 N, into a vessel 42 provided with heating coil 43 and condensor 44. The solution of hop extract in alkali typically containing from 0.5 to 2 $gl^{-1}$ of $\alpha$-acids at pH of 8 to 11 is boiled e.g. for from 5 minutes to 2 hours, to isomerise the $\alpha$-acids in the extract to iso-$\alpha$-acids. The steam evolved during this boiling carries with it hop oil present in the primary extract. The water vapour and hop oil are condensed in condenser 44 and can be collected at 45. After completion of the isomerisation the alkaline solution is removed from vessel 42 via valve 46 and passed through cooler 47 where the solution is preferably cooled to between 0° and 10° C. After cooling the solution 48 is fed to vessel 49 equipped with stirrer 52 and pH meter 51. Acid 50 e.g. hydrochloric acid at a suitable concentration is fed into vessel 49 to acidify the isomerized extract e.g. to a pH of from 2.5 to 5. The acid mixture is stirred and the $\beta$-acids precipitated. The mixture, containing a filter aid such as kieselguhr if desired is then passed via valve 53 through filter or centrifuge 54. The filtered or centrifuged solution 55 is then fed to vessel 56 equipped with stirrer 59 and pH meter 58. Alkali 57 e.g. sodium and/or potassium hydroxide and/or carbonate is fed into vessel 56 to make the solution of iso-$\alpha$-acid alkaline e.g. to a pH of from 8 to 10. This alkaline solution is then passed via valve 60 to concentrator 61 which may conveniently be a flash evaporator provided with heating coil 62, vapour trap 63, vacuum pump 64 and condensate collector 65. The temperature inside the evaporator is preferably not more than 40° C. in order to avoid degradation of the iso-$\alpha$-acids. The concentrated iso-$\alpha$-acid preparation can be removed from collector 65 via valve 66.

Although the apparatus illustrated in FIG. 3 is described as producing a concentrated iso-$\alpha$-acid preparation it will be appreciated that, if desired, the isomerised $\alpha$-acid solution may be taken from a previous stage of the preparation e.g. after filter 54 or from valve 60 if desired. Further, the apparatus has been described in batchwise operation; if desired continuous or partly continuous operation may be effected if desired.

The design of the individual pieces of equipment for use in such apparatus is straight forward; indeed suitable (although perhaps not optimum equipment) will, we expect, be available "off the shelf". Truly continuous operation may require custom built equipment but we believe that design of such equipment would not present any substantial difficulty to the skilled chemical engineer. Equipment other than as illustrated may be appropriate to suit particular needs and the isomerization step of the method of the invention is not limited by the particular form of apparatus in which it is performed.

The invention will be described further in the following examples.

EXAMPLE 1

Extraction of Hops (Batch Process) and Conversion to an Isomerized Extract 100 g of Powered Wye Northdown hops, which contained 7.3% α-acid, were extracted in the apparatus shown in FIG. 1 generally as described below.

1.0 liter of liquid carbon dioxide was introduced to the cell 2 via inlet 3 and associated valve 4 at a pressure of 730 p.s.i.g. At this pressure the temperature inside the cell was about 16° C. The cell was rocked for 15 minutes, during which the pressure increased to 745 p.s.i.g. Tap 7 was opened and the liquid was then passed through sintered filter 6 into flask 11 standing in second cell 10. Tap 7 was closed and tap 14 was then opened and the liquid carbon dioxide was evaporated as gas which was vented to the atmosphere over a period of 45 minutes. The hopes were extracted a further seven times using this procedure and the extracts, which contained residual solid carbon dioxide, were bulked. The flask was removed from the pressurized vessel and the residual solid carbon dioxide was evaporated, via a bunsen value, to leave a yellow viscous extract (15.8 g).

The extract was examined by thin-layer chromatography using the procedure described by the European Brewery Convention (J. Inst. Brewing 1970, 76, 386) and the presence of only α-acids and β-acids were revealed as two distinct spots when the plate was sprayed with ferric chloride reagent. When products obtained by extracting hops with organic solvents are examined by this technique, the chromatogram is normally complex and often consists of more than ten spots.

The extract was shown to contain 40.7% of α-acid when estimated by a conductometric procedure (J. Inst. Brewing 1970, 76, 343) using methanolic lead acetate. Hence 88.1% of the available α-acids were extracted from the hops using liquid carbon dioxide. Examination of the extract by column chromatography on Sephadex (J. Inst. Brewing, 1972, 78, 57) revealed that 70.2% of the β-acid present in the hops had been extracted.

A 10.0 g portion of the extract was steam distilled using the procedure similar to that described by Howard (J. Inst. Brewing, 1970, 76, 381) and a total of 450 mg of hop oil was collected. In this experiment the liquid carbon dioxide had extracted 83% of the available oil from the hops.

Similar yields of oils and resins were obtained when powdered Wye Challenger hops were extracted by this process using liquid carbon dioxide. This solvent was used to extract whole hop cones from the variety Wye Challenger and also cones which had not been dried, i.e. green hops. Hop resins and oil were successfully extracted from these samples.

A 1.1 g portion of the extract obtained from Wye Northdown hops and containing 40.7% α-acid was placed in a flask fitted to a condenser via a cohobation head. 500 ml of 0.1 N sodium carbonate was added and the mixture was boiled for 15 minutes under an atmosphere of nitrogen. The hop oil was discarded and the mixture cooled to ~0° C. and the pH was adjusted to 4.0 by the addition of 2 N hydrochloric acid. The mixture was stirred at constant pH for 1.0 hour, kieselguhr (10 g) was added and a stream of nitrogen was passed through the mixture for 5 minutes to aid flocculation of the α-acids. The mixture was filtered through a bed of kieselguhr (40 g) which was washed with water. The filtrate and washings were combined and the pH of the solution adjusted to 9.0 by the addition of 2 N potassium carbonate to give a dilute solution of the required isomerized extract. A qualitative examination of the extract by thin-layer chromatography showed the presence of iso-α-acids together with only trace quantities of α-acids and β-acids. A quantitative analysis of this extract using the method of Otter et al (J. Inst. Brewing, 1972, 78, 57) revealed that the yield of iso-α-acids obtained from the hop extract was 79.9%. Hence 70.4% of the available α-acids present in the Wye Northdown hops were converted into iso-α-acids.

The extract was concentrated to 15% iso-α-acids (W/V) using a rotary evaporator (both temperature 35° C., 15 mm/Hg) without loss of iso-α-acids.

EXAMPLE 2

Preparation of an Isomerized Extract (Semi-Continuous Extraction of Hops)

200 g of powdered Northern Brewer hops which contained 6.1% of α-acid were placed in the column of the semi-continuous extractor shown in FIG. 2. Liquid carbon dioxide was circulated through the system at a pressure of 890–910 p.s.i.g. for 5 hours. The pressure in the system was released and the extract which had collected in the evaporator (temperature 40° C.) was recovered.

A further five 200 g samples of hops were extracted in the same manner and the extract obtained from the six extractions bulked (157.8 g). The extract was examined using the procedures described in Example 1 and the following results were obtained:

(a) only α-acid β-acids could be detected by thin layer chromatograph
(b) 93% of the available α-acids and 60% of the available β-acids were extracted by the liquid carbon dioxide.
(c) 70% of the available hop oil was present in the extract.

28.0 g of the hop extract which contained 43% α-acid were isomerized in a similar manner to that described in Example 1 and a yield of 98% iso-α-acid was obtained after filtration through kieselguhr. Only trace amounts of α- and β-acid were detected in the extract.

The volume of the aqueous iso-extract at pH 4 (8.2 l) was reduced to below 1 liter by evaporation at 50°/15 mm of Hg. The pH was then adjusted to 9 with 0.2 N sodium carbonate solution and the volume made up to 1 liter to give isomerized extract as a pale yellow solution (overall yield of iso-α-acid 88%, i.e. 1.06% w/v).

Additions were made to an unhopped beer by adding the isomerized extract (diluted to 0.50% w/v iso-α-acid) prior to racking at a rate of 30 mg iso-α-acid per liter of beer. The bitterness of the resultant beer measured by the recommended method of analysis (J. Inst. Brew., 1971, 77, 181) was 26 EBU. The utilization of iso-α-acid in the beer was thus 86%.

Isomerized extract was also added to beer in the bright beer tank prior to bottling at a rate of 42 mg iso-α-acid per liter of beer. The bitterness of the bottled beer measured as above was 35 EBU. The utilization of iso-α-acid in the beer was thus 83%.

A commercial isomerized hop extract was added to another batch of the same beer in the bright beer tank at the same dilution and rate of addition as that used with the above iso-extract. The initial haze readings of the resultant bottled beers, as measured by the recommended methods of analysis (J. Inst. Brew., 1971, 77, 181), were 0.60 EBC units for the beer bittered with the iso-extracted prepared in this Example and 4.42 EBC units for the beer containing the commercial isomerized hop extract. The haze reading of the beer bittered with iso-extract prepared by this Example did not exceed 105 EBC units after 15 weeks storage. Beer is reckoned to have satisfactory storage stability with reference to haze formation if the haze reading is not more than 205 EBC units after 12 weeks storage. Induced gushing tests were carried out on the bottle beers by the method of Laws and McGuinness (J. Inst. Brewing, 1972, 78, 303) when the loss of beer recorded was 0.4 g/½ pint for the beer containing iso-extract prepared in this Example and 117.4 g/½ pint for the beer containing the commercial isomerized hop extract. For comparison, an equivalent traditionally brewed (i.e. not involving addition of extract or iso-extract after brewing) bottled beer loses typically from 0.5 to 5 g/½ point under similar testing. Hence the beer bittered with the new isomerized extract did not have a tendency to gush.

EXAMPLE 3

Semi-Continuous Extraction of Hops on the Pilot Plant Scale 830 g of powdered Wye Northdown hops containing 7.1% of α-acid were placed in the column of the semi-continuous extraction apparatus illustrated in FIG. 2. Liquid carbon dioxide was circulated through the system at a rate of 6.4 liters/hour and pressure of 870 p.s.i.g. for 5 hours. The pressure in the system was released using the vent valve and the extract (114.8 g) which had collected in the evaporator was isomerized using the procedure described in Example I and analysis of the product revealed that the overall efficiency of the extraction of α-acid and isomerization was 88%.

EXAMPLE 4

Samples of a variety of hop cultivars were extracted with liquid $CO_2$ and isomerised according to the proceedures described in 2 above. The extracts and isomerised extracts were of a similar high purity. The results of the extractions and isomerisations are summarised in Table 3 and the results of tests on haze formation, gushing, bitterness and utilisation of these isomerised extracts when added to beer are given in Table 4.

TABLE 3

| Hop Cultivar | Extraction Time (hours) | Yield of extract (wt % on hops) | Proportion of α-acids in Extract (%) α-acids | Available Hop Components Extracted (%) α-acids | β-acids | Hop oil | Yield in Isomerization (%) | Overall yield of iso-α-acids (%) |
|---|---|---|---|---|---|---|---|---|
| Northern Brewer | 5 | 13.2 | 46.0 | 96 | 87 | 67 | 97.4 | 93.5 |
| Comet | 3 | 13.8 | 39.9 | 95 | 60 | 71 | 70.0 | 66.5 |
| Wye Northdown | 2 | 15.4 | 43.5 | 92 | 81 | 83 | 79.9 | 73.5 |
| Wye Target | 1 | 13.8 | 54 | 81 | 56 | 86 | 95.1 | 77 |

TABLE 4

| Hop Cultivar | Iso-α-acids added ppm | Haze (E.B.C. Units) Initial | Haze (E.B.C. Units) After Addition | Induced gushing[4] (Beer loss) | Beer Bitterness (E.B.U. Units) | Utilization % |
|---|---|---|---|---|---|---|
| Northern Brewer | 24.5 | 0.52 | 0.55 | none | 21.4 | 87.3 |
| Comet | 24.8 | 0.52 | 0.52 | none | 20.5 | 82.7 |
| Commercial iso-extract A | 25.3 | 0.52 | 3.8 | 69.7 | 19.1 | 75.4 |
| Commercial iso-extract B | 25.0 | 0.52 | 4.1 | 78.2 | 18.9 | 75.7 |
| Control[5] | — | 0.52 | — | 0.5 | — | — |

[4] wt loss from bottles containing 278 ml beer
[5] Unhopped beer

We claim:
1. A method of making an iso-alpha-acid preparation, suitable for addition to beer without haze formation which method consists essentially of:
   (i) extracting hops with liquid carbon dioxide at a temperature of from −5° C. to 20° C. and under a pressure of slightly greater than that of the corresponding vapor pressure of liquid carbon dioxide at the extraction temperature, thereby extracting at least a portion of the alpha-acids contained in the hops into the carbon dioxide;
   (ii) evaporating off the liquid carbon dioxide under conditions such that the extract comes in contact only with equipment which is chemically inert to the extract, thereby recovering a primary hop extract of high purity consisting essentially of alpha-acids, beta-acids, hop oil and the following impurities: uncharacterized soft resins up to 3%; hard resins up to 0.5%; tannins up to 0.5%; chlorophyll up to 0.2%; fats and waxes up to 0.2%; fines up to 0.5% and inorganic salts up to 0.5%, the total impurities being up to 4% and said extract being yellow;
   (iii) preparing an alkaline aqueous solution containing the extract; and
   (iv) boiling this solution to convert substantially all the alpha-acids present therein to iso-alpha-acids.
2. The method as claimed in claim 1 wherein in step (iii), the alkali used is sodium and/or potassium carbonate and is at a concentration sufficient to give a pH of from 8 to 11.

* * * * *